(12) United States Patent
Kramm et al.

(10) Patent No.: US 6,962,761 B2
(45) Date of Patent: Nov. 8, 2005

(54) VIBRATION-RESISTANT ACCUMULATOR AND METHOD OF ITS MANUFACTURE

(75) Inventors: Friedrich Kramm, Buedingen (DE); Wolfgang Imhof, Kefenrod (DE); Gunter Schmidt-Lukasch, Alsbach-Haehnlein (DE)

(73) Assignee: Deutsche EXIDE Standby GmbH, Budingen (DE)

(*) Notice: Subject to any disclaimer, the term of this patent is extended or adjusted under 35 U.S.C. 154(b) by 421 days.

(21) Appl. No.: 10/364,862
(22) Filed: Feb. 11, 2003

(65) Prior Publication Data
US 2003/0152832 A1 Aug. 14, 2003

(30) Foreign Application Priority Data
Feb. 12, 2002 (DE) .......................... 102 05 658

(51) Int. Cl.[7] .............................. H01M 10/16
(52) U.S. Cl. ...................... 429/161; 429/185; 29/623.2
(58) Field of Search .................. 429/161, 185; 29/623.2

(56) References Cited

U.S. PATENT DOCUMENTS 4,495,259 A * 1/1985 Uba ........................... 429/161
5,607,797 A * 3/1997 Hasegawa et al. .......... 429/208

FOREIGN PATENT DOCUMENTS

| DE | 3533579 | 3/1987 |
| DE | 3833426 | 4/1990 |
| JP | 63 291361 A | 3/1989 |
| JP | 10 144269 A | 8/1998 |

* cited by examiner

Primary Examiner—Mark Ruthkosky
(74) Attorney, Agent, or Firm—Paul & Paul (57) ABSTRACT

The present invention relates to a vibration-resistant accumulator with a housing (20), which comprises one or more cell boxes (16) each with a plate block (15) with positive and negative plate groups (14a, 14b), with the individual plates (1a, 1b) in a plate block (15) separated from one another by separators (6), the plates (1a, 1b) of each plate group (14a, 14b) having lugs (2a, 2b) and being connected together electrically by cell connectors (3a, 3b). In order to provide a vibration-resistant accumulator that is improved relative to the state of the art, withstands severe loading, can be manufactured comparatively easily and inexpensively, and permits safe filling of the electrolyte, according to the invention it is proposed to provide a hardenable sealing compound (8), which fixes the plate block (15) in a cell box (16) in a substantially vibration-resistant manner, with the sealing compound (8) arranged above the plates (1a, 1b) of the plate block (15) and at least partially filling the space between the top of the plate block (15) and the cell connectors (3a, 3b) and with a sealant guide bridge (7) provided on the top of the plate block (15), and delimiting a region that is free from sealing compound (8) on the top of the plate block (15).

13 Claims, 5 Drawing Sheets

VIBRATION-RESISTANT ACCUMULATOR AND METHOD OF ITS MANUFACTURE

The present invention relates to a vibration-resistant accumulator with a housing that comprises one or more cell boxes each with a block of plates consisting of positive and negative plate groups, wherein the individual plates in a block of plates are separated from one another by separators, and the plates of each plate group have lugs and are connected together electrically by cell connectors. In addition the invention relates to a method of manufacture of a vibration-resistant accumulator of this kind.

Accumulators, especially lead-acid accumulators, are often used in applications in which they are subjected to severe vibrating and jolting loads. These include for example starter batteries in passenger cars, lorries and buses. The accumulators in off-road motor vehicles, for example military land vehicles, building and agricultural machinery, are exposed to particularly high vibrating loads. The requirements on vibrational or jolting strength are often subject to standard specifications which are not in general fulfilled without special design measures for the accumulator. For instance, accumulators for military applications in Germany are subject to the army testing standards (Bundeswehrprüfnormen) for defence equipment. According to the army testing standard VG 96924, accumulators for military applications must pass a vibration strength test in which the accumulators are shaken in the three principal axes X (horizontal, parallel to the accumulator plates), Y (horizontal, at right angles to the accumulator plates) and Z (vertical) for a period of two to three hours in each case under specified frequency conditions. This is followed by high-current loading, to simulate starting of the vehicle equipped with the accumulator.

Existing accumulators, such as are used in passenger cars, as a rule do not meet the stringent requirements of the standards for military land vehicles or other severely loaded vehicles. Reasons for failure of accumulators when subjected to vibration or jolting include detachment of terminal posts, intercell connections, the lugs of the plates and breakage of cell connectors. Furthermore, when there is resonant vibration of the plates there is often detachment of the active material (paste) from the paste carrier (e.g. from the lead grid), which can also lead to failure of the accumulator.

At present, various design approaches are followed for fixing the plates of the plate block in the cell boxes of an accumulator. In one known design, the plates of the accumulator are fixed at the bottom of the cell boxes using plastics or sealing compound. However, this does not prevent detachment of the terminal posts and of the intercell connections and of the lugs in the upper region of the plate block. In another known design the plate block is held down in the cell boxes by plastics parts, the plastics parts being secured to the cell covers and fixed on the separators. This does not, however, prevent failure of the accumulators when jolted in the horizontal direction, i.e. with jolting in the direction of the aforementioned X and Y axes. In another variant of known accumulators, jolting strength is supposed to be obtained by inserting a plastic or sealing compound between the plates and the vertical side of the cell connectors. This does not, however, prevent detachment of the lugs and falling of the active material out of the plates, especially not when there is jolting perpendicular to the plate surface, i.e. in the direction of the aforementioned Y axis. In another known variant a two-component epoxy sealing compound is placed on the plate groups in front of the cell connectors and in the lateral regions of the cells. This leads to a marked improvement in vibration strength, since the material passes under the cell connectors and forms a hard immobilisation of the plate group. However, a disadvantage is that when the sealing compound is applied in or on the plate groups there is considerable flow towards the centre of the cell over the plates and separators, so that the opening that is left for the subsequent filling with electrolyte is very small.

The problem to be solved by the present invention is accordingly to provide a vibration-resistant accumulator that is improved relative to the state of the art, withstands severe loading, can be manufactured comparatively easily and inexpensively, and permits safe filling of the electrolyte.

This problem is solved according to the invention by a vibration-resistant accumulator of the type stated at the outset, which is characterized in that a hardenable sealing compound is provided, which fixes the plate block in a cell box so that it is substantially vibration-resistant, with the sealing compound running over the plates of the plate block and at least partially filling the space between the top of the plate block and the cell connectors, with a sealing-compound guiding bridge provided on the top of the plate block, which delimits a region on top of the plate block that is free from sealing compound.

Accumulators, such as those used for example for military and civilian land vehicles, as a rule consist of a housing in which several cells, e.g. lead-acid cells, are connected together in series one after another. For this, the housing has several chambers, called cell boxes. Each cell box accommodates one plate block with positive and negative plate groups. The individual plates are separated from one another by separators which do not conduct electric current. The plates of each plate group have lugs, by which all the plates of a plate group are connected together electrically with a cell connector. As a rule the lugs of the plates point in the vertical direction upwards out of the plate block, and the lugs and cell connectors of the positive and negative plate groups are arranged above the plates on opposite sides.

The number of cells connected in series one after another in the accumulator depends on the voltage the accumulator is required to have. Often two, three, six or more cells are connected together in series one after another in a housing. The housing thus has a corresponding number of cells. Electrical connection of two cells is achieved by intercell connectors between adjacent cell boxes, with the intercell connectors as a rule formed integral with the cell connectors and passing through the walls of the adjacent cell boxes. The first and last of the series-connected cells each have a cell connector with a terminal post, which is brought out to the exterior through the housing cover for electrical connection.

A point of an accumulator that is especially sensitive to vibration is the connection between the lugs of the electrode plates and the cell connectors. In particular, this connection is stabilized advantageously by the arrangement according to the invention, and detachment of the lugs or of the cell connectors is prevented by fixing of the lugs relative to the cell connectors.

An essential element of the present invention is the provision of a sealant guide bridge over each plate block. During manufacture of the vibration-resistant accumulator according to the invention, such a sealant guide bridge is placed on the plate block that is already inserted in the housing, and the sealing compound is introduced. In a preferred version of the invention, the sealant guide bridge is formed in such a way that it has a closed profile around the region on the top of the plate block that is to be kept free from sealing compound. When it is introduced, the sealing compound is filled outside of the region that is to be kept free on the top of the plate block. On this external side, i.e. on the side turned away from the region that is to be kept free on the top of the plate block, the sealant guide bridge has run-off surfaces for draining of the sealing compound when it is introduced into the accumulator. As it is introduced, the sealing compound runs outside of the region that is to be kept free on the top of the plate block, as far as the walls of the cell box and also into the spaces between the lugs of the plates and under the cell connectors fitted above the lugs. The profile of the sealant guide bridge has a height that spans from the top of the separators of the plate block on which the sealant guide bridge is placed as far as the deepest vertical extent of the cell connectors. Usually the separators project at least in the vertical direction upwards somewhat above the plates. Advantageously, the height of the profile of the sealant guide bridge extends over the deepest vertical extent of the cell connectors. This ensures that the sealing compound can be filled in such a way that it completely fills the space between the plate block and the underside of the cell connectors, without it flowing beyond the profile of the sealant guide bridge into the region that is to be kept free on the top of the plate block. After the sealing compound has hardened, the lugs of the plates are firmly embedded in the sealing compound and moreover the cell connectors are fixed in a vibration-resistant manner against the plate block through filling of at least a part of the cavity in between.

Preferably, according to the invention, the sealant guide bridge remains in the accumulator after filling and hardening of the sealing compound. An alternative version of the invention also envisages removal of the sealant guide bridge after filling and hardening of the sealing compound. After the sealing compound has hardened, the accumulator is filled with electrolyte, which is carried out in a known manner. The accumulator design according to the invention offers the advantage that for the filling of the electrolyte, especially when using gel electrolytes, a larger free region is available on top of the plate block, compared with known sealed-in accumulators. The area of this free region is defined by the area that is kept free from sealing compound because of the sealant guide bridge. In existing accumulators, the sealing compound has always run well into the central region on the top of the plate block.

Advantageously the sealant guide bridge consists of plastic, and particularly preferably of an electrolyte-resistant plastic, so that if it remains in the accumulator it is not attacked by the electrolyte that is poured in. This ensures the stability of sealing in conjunction with the sealant guide bridge.

Manufacture of the sealant guide bridge in polyvinyl chloride (PVC), polypropylene (PP), polyethylene (PE), polystyrene (PS), acrylonitrile butadiene styrene (ABS), styrene acrylonitrile (SAN) or polycarbonate is particularly preferred. The sealant guide bridge according to the invention can be made from these materials simply and cheaply, e.g. by injection moulding or deep drawing.

In an alternative version, the sealant guide bridge has two substantially rectilinear profile parts, which are joined together by a spacer and are arranged substantially parallel to one another and some distance apart. In this version of the invention, the two profile parts that are arranged parallel to one another are laid, prior to sealing, on top of the respective plate block in such a way that each of the two profiles faces one of the two cell connectors arranged opposite each other. Preferably the two substantially rectilinear profile parts, arranged parallel to one another, are of such a length that after they are placed on the top of the plate block they just touch the walls of the cell box. This prevents the poured-in sealing compound running past the ends of the profile parts and into the central region on the top of the plate block. In this version of the sealant guide bridge according to the invention, the sealing compound is poured in on both sides facing the cell connectors. In the central region on top of the plate block, advantageously a region over the entire width of the plate block is thus kept free of sealing compound. As a result, on the one hand there is a saving of sealing compound, and on the other hand a larger free region is provided for filling the electrolyte over the entire width of the plate block.

The object of the present invention is also achieved by a method of manufacture of a vibration-resistant accumulator in which a plate block with positive and negative plate groups is placed in each cell box in a housing that has one or more cell boxes, with the individual plates in a plate block separated from one another by separators and the plates of each plate group having lugs, cell connectors are applied, which connect the plates of each plate group together electrically, a sealant guide bridge is laid on the top of the plate block and a hardenable sealing compound is introduced in such a way that it is arranged above the plates of the plate block, at least partially fills the space between the top of the plate block and the cell connectors, and the sealant guide bridge delimits a region on the surface of the plate block that is free from sealing compound.

The invention also relates to the sealant guide bridge itself in all versions as described here.

Other advantages, features and versions of the present invention will now be explained on the basis of the following description of some appended drawings.

Figure 1:
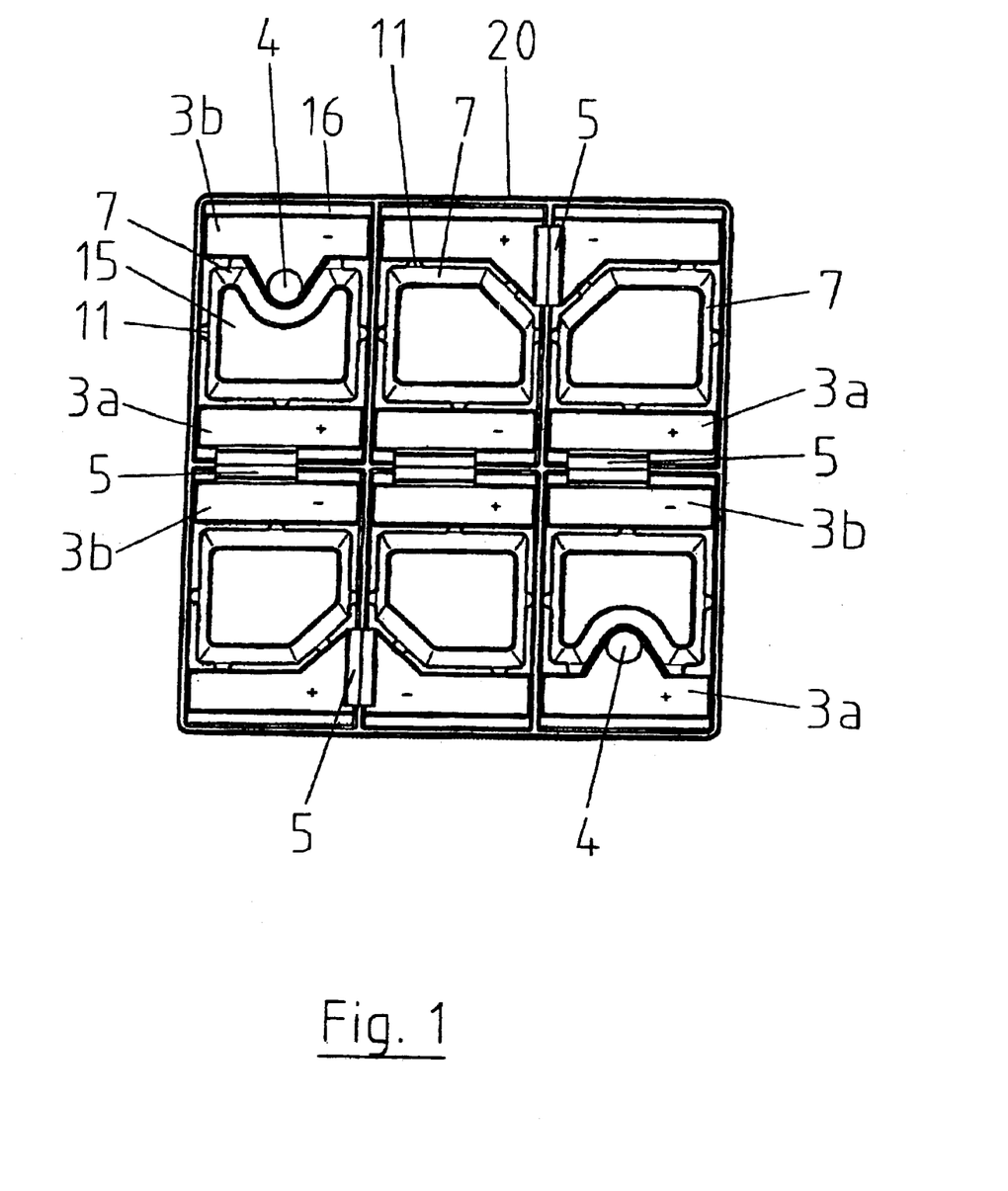
FIG. 1 shows a top view of an accumulator according to the invention, before the sealing compound is introduced.

FIG. 1 shows an accumulator according to the invention, in a housing 20 with six cell boxes 16. The six accumulator cells in housing 20 are connected together in series by electrically conducting intercell connectors 5. Each cell comprises a plate block 15, consisting of a positive and a negative plate group (not shown), with the individual plates separated from one another by separators. In housing 20, the individual cell boxes 16 are separated from one another by partitions in housing 20. The plates of each positive plate group in a cell are connected together electrically-conducting by cell connectors 3a. Similarly, the plates of each negative plate group of a cell are connected together electrically-conducting via cell connectors 3b. The electrical connection between two cells connected together in series is provided by connecting in each case the positive cell connector 3a of a cell with the negative cell connector 3b of another cell via intercell connectors 5, which connect the cell connectors together electrically and pass through openings in the walls of the cell boxes. The first and the last of the series-connected cells each have a terminal post 4 for tapping of the electric current from the accumulator.

Each of the cells has a sealant guide bridge 7 which is laid on the surface of the respective plate block 15. Each of the sealant guide bridges 7 is provided with spacers 11, directed outwards when viewed from above, which serve for positioning the sealant guide bridge 7 in the respective cell box 16. Viewed from above, the sealant guide bridges 7 can have various basic shapes. In the present accumulator according to FIG. 1, the basic shape of the sealant guide bridge 7 is in each case adapted to the free region above the plate block, and this free region above the plate block for the cells arranged in series at the beginning and at the end, owing to the form of the cell connectors 3a and 3b with terminal posts 4, differs from that of the other cells, which are arranged in series between the two end cells.

Figure 2:
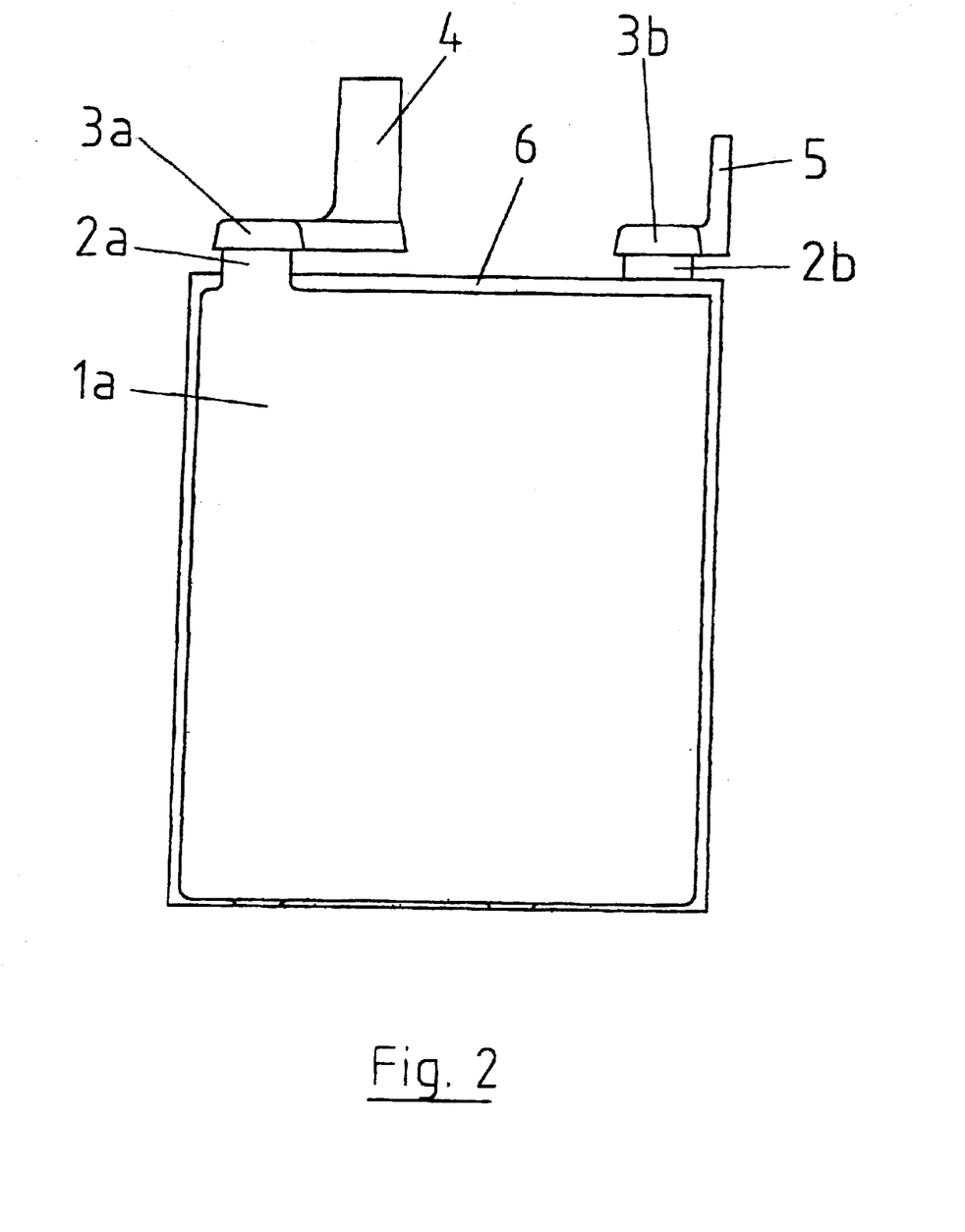
FIG. 2 shows a cross-section through an accumulator cell in the plane of the plate block without the sealant guide bridge and sealing compound.

FIG. 2 shows a cell in cross-section along the plane of a plate 1a in the plate block, being a cell with terminal post 4 at the beginning or at the end of a number of cells connected together in series. Plate 1a has a lug 2a directed vertically upwards, which is connected to a cell connector 3a. Plate 1a is connected electrically via cell connector 3a to all the other plates of the same plate group. The plates of the oppositely poled plate group (not shown) are also connected together electrically-conducting via lugs 2b and a cell connector 3b. The cell connectors 3a and 3b are arranged above the plate block on opposite sides of the cell box. Cell connector 3b has an intercell connector 5 through which the cell is connected to the cell connector of the oppositely poled plate group of the next cell.

It is clear from FIG. 2 that the connection of the plates to the cell connectors 3a and 3b, namely the lugs 2a and 2b, are the weakest points of the cell shown. When the accumulator is severely loaded by vibration or jolting, these connections tend to pull away or break off.

Figure 3:
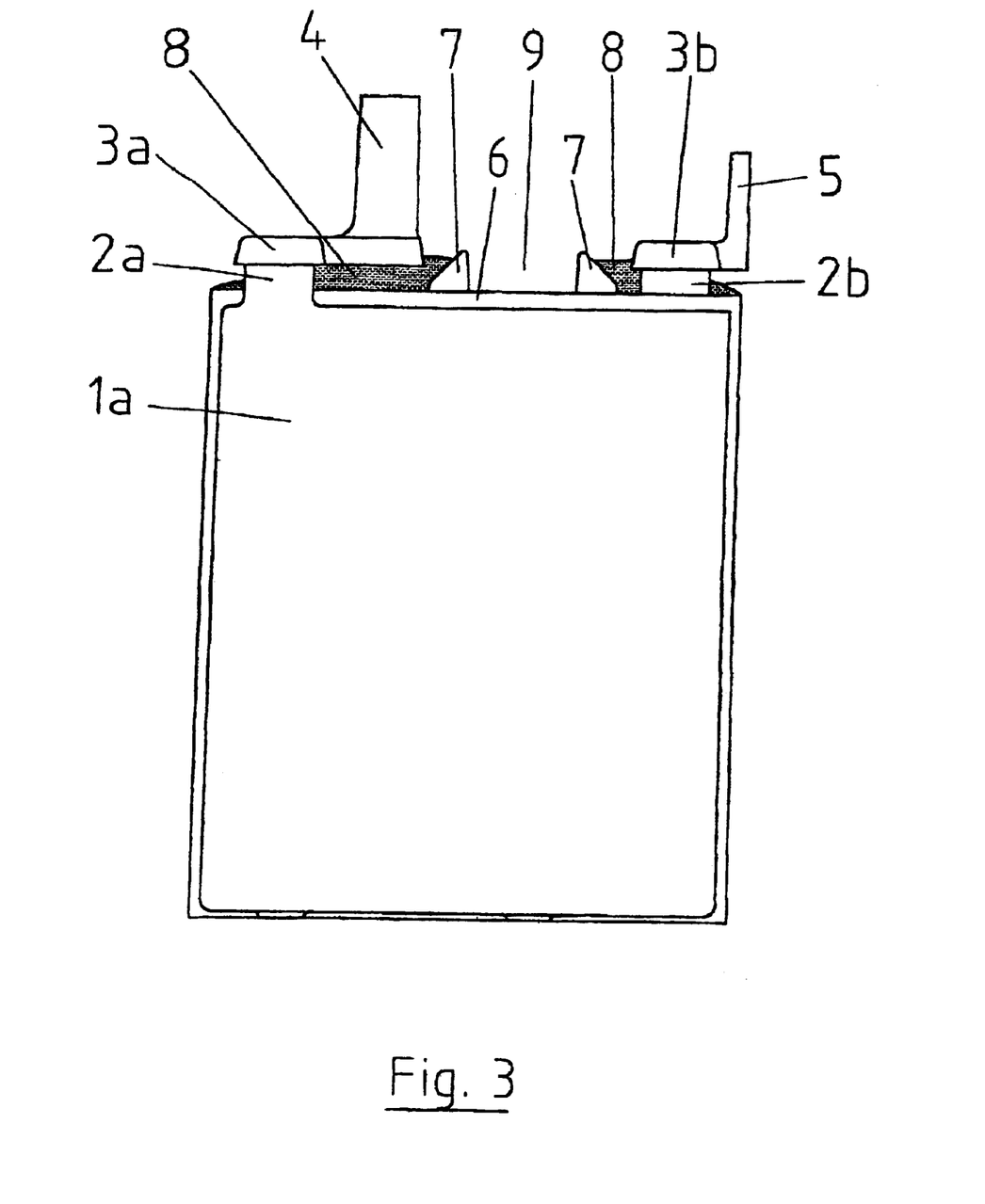
FIG. 3 shows the same view of an accumulator cell as in FIG. 2, but with the sealant guide bridge and sealing compound.
Figure 4:
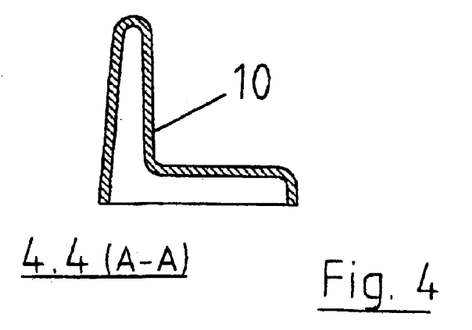
FIG. 4 shows various versions of the sealant guide bridges according to the invention, from above and in cross-section.

FIG. 3 shows the same representation of the cell in FIG. 2, but with the sealant guide bridge 7 according to the invention and with the sealing compound 8 introduced and hardened. The height of the profile of the sealant guide bridge 7 extends vertically over the lowest point of the cell connectors, so that the sealing compound 8, when introduced in liquid form, completely fills the space between the plate block and the cell connectors, so that after hardening it fixes the relative position of the cell connectors 3a and 3b to the plate block. Furthermore, the sealing compound runs between the lugs 2a and 2b of the plates of the plate block, so that the latter are fixed in it after hardening of the sealing compound 8. The sealant guide bridge 7 ensures that when the sealing compound 8 is introduced it does not spread over the plate block completely, so that a free region 9 is left above the plate block for subsequent filling of the gel electrolyte. When introducing the sealing compound 8, it is necessary to ensure that it is only introduced around the outside of the sealant guide bridge 7, i.e. outside of the region 9 that is to be kept free from sealing compound. The outer region of the profile of the sealant guide bridge 7 is provided with slanting run-off surfaces, so that as the sealing compound 8 is introduced it flows away from the region 9 that is to be kept free, and under the cell connectors 3a and 3b.

FIGS. 4.1 and 4.2 show two different versions of the sealant guide bridges 7, viewed from above. The sealant guide bridge 7 shown in FIG. 4.1 consists of a closed profile 13 around the region 9 that is to be kept free on the surface of a plate block. The profile is provided at several points with spacers 11, which facilitate positioning of the sealant guide bridge 7 in the cell box on the plate block and hold the sealant guide bridge 7 at a distance from the walls of the cell box. Maintaining a lateral gap between the sealant guide bridge 7 and the cell walls ensures that in this version of the sealant guide bridge 7 according to the invention, the sealing compound comes into contact with the side walls of the cell boxes and at the same time with the adjacent surface regions of the plate block. This ensures improved fixation of the plate block in the cell box.

FIG. 4.2 shows an alternative version of the sealant guide bridge 7 according to the invention, with two substantially rectilinear profile parts 13, which are joined together by a distance piece 12 and are arranged substantially parallel to one another with a gap between them. This version of the sealant guide bridge according to the invention is placed, prior to introduction of the sealing compound, on the plate block in such a way that the two profile parts 13 are each directed to one of the two cell connectors opposite one another in the cell, above the plate block. The length of the two profile parts is chosen so that the ends of the profile parts touch the side walls of the cell box, so as to substantially exclude flow of the sealing compound into the region 9 that is to be kept free. The version of the sealant guide bridge according to FIG. 4.2 has the advantage over that in FIG. 4.1 that the free region 9 for filling of the electrolyte above the plate block is larger and extends over the full width of the plate block. Conversely, the version according to FIG. 4.1 has the advantage that all of the sealing compound applied above the plate block remains continuous and hardens as a single piece, whereas when using the sealant guide bridge according to FIG. 4.2 there are two sealing regions that are separated from one another, which in each case fix the regions of the cell that are sensitive to vibration and jolting on the lugs of the electrode plates and between the plate block and the cell connectors.

FIGS. 4.3, 4.4 and 4.5 each show various profiles of the sealant guide bridges 7 from FIGS. 4.1 and 4.2 in cross-section along line A—A. Each of the profiles has a run-off surface 10, over which the sealing compound, as it is introduced, can flow away towards the cell connectors. FIG. 4.3 additionally shows a spacer 11, as described above.

Figure 5:
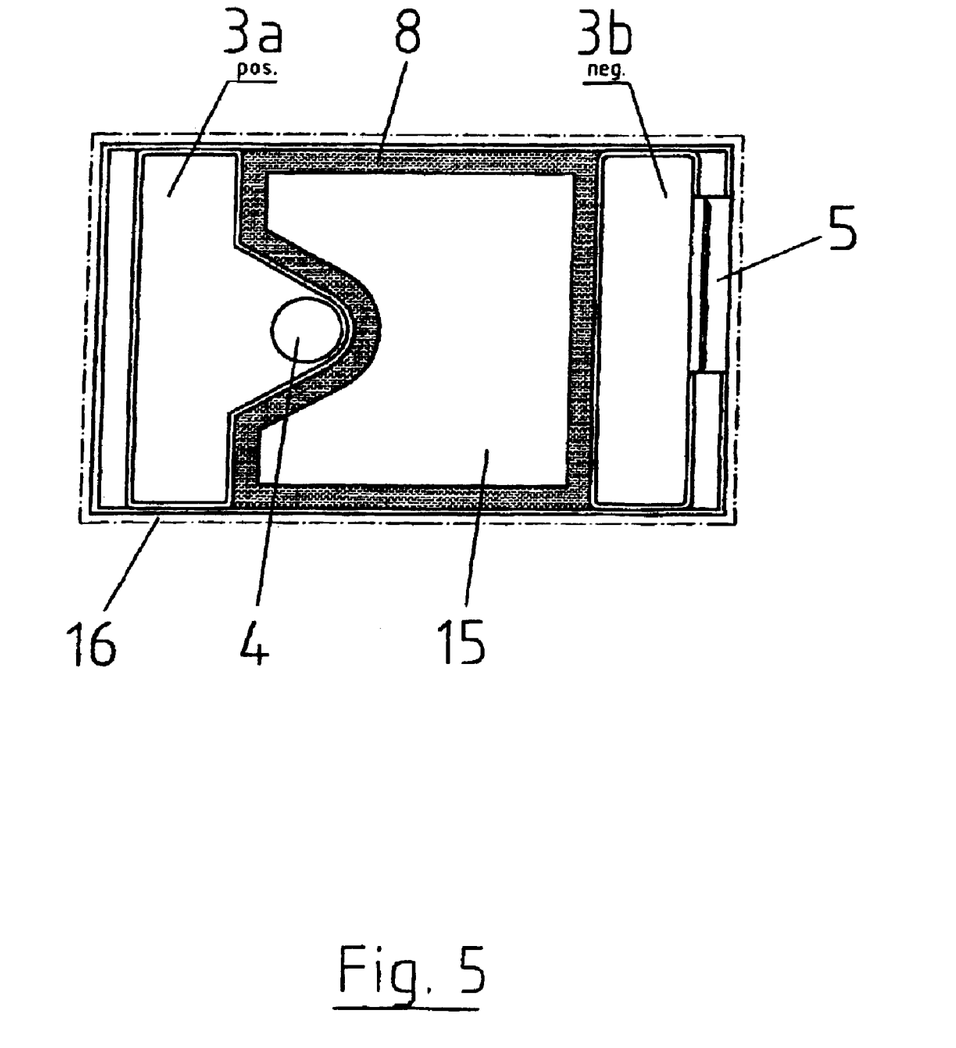
FIG. 5 shows a cell of the accumulator in FIG. 1 viewed from above, with sealing compound.

FIG. 5 shows a cell with a plate block 15, which also forms part of the accumulator in FIG. 1, with sealing compound 8 already having been introduced for fixing the individual parts of the cell, in the case of the cell in FIG. 5.

What is claimed is:

1. A vibration-resistant accumulator with a housing (20), which comprises one or more cell boxes (16) each with a plate block (15) with positive and negative plate groups (14a, 14b), with the individual plates (1a, 1b) in a plate block (15) separated from one another by separators (6), the plates (1a, 1b) of each plate group (14a, 14b) having lugs (2a, 2b) and being connected together electrically through cell connectors (3a, 3b), characterized in that a hardenable sealing compound (8) is provided, which fixes the plate block (15) in a cell box (16) in a substantially vibration-resistant manner, with the sealing compound (8) arranged above the plates (1a, 1b) of the plate block (15) and at least partially filling the space between the top of the plate block (15) and the cell connectors (3a, 3b) and with a sealant guide bridge (7) provided on the top of the plate block (15), delimiting a region that is free from sealing compound (8) on the top of the plate block (15).

2. A vibration-resistant accumulator according to claim 1, characterized in that the sealant guide bridge (7) is made of plastic, preferably of electrolyte-resistant plastic.

3. A vibration-resistant accumulator according to claim 2, characterized in that the sealant guide bridge (7) is made of polyvinyl chloride (PVC), polypropylene (PP), polyethylene (PE), polystyrene (PS), acrylonitrile butadiene styrene (ABS), styrene acrylonitrile (SAN) or polycarbonate.

4. A vibration-resistant accumulator according to one of claims 1 to 3, characterized in that the sealant guide bridge (7) consists of a closed profile around the free region on the top of the plate block (15).

5. A vibration-resistant accumulator according to one of claims 1 to 3, characterized in that the sealing compound (8) in addition at least partially fills the upper space between the outer plates (1a, 1b) of the plate block (15) and the side walls of the cell box (16).

6. A vibration-resistant accumulator according to one of claims 1 to 3, characterized in that the sealant guide bridge (7) has two substantially rectilinear profile parts which are joined together by a distance piece (12) and are arranged substantially parallel to one another and with a gap between them.

7. A vibration-resistant accumulator according to one of claims 1 to 3, characterized in that on the side of the profile turned away from the region free from sealing compound (8), the sealant guide bridge (7) has run-off surfaces (10) for draining of the sealing compound (8) when it is introduced into the accumulator.

8. A method of manufacture of a vibration-resistant accumulator, in which a plate block (15) with positive and negative plate groups (14a, 14b) is placed in each cell box (16) in a housing (20) that has one or more cell boxes (16), with the individual plates (1a, 1b) in a plate block (15) separated from one another by separators (6) and the plates (1a, 1b) of each plate group (14a, 14b) having lugs (2a, 2b), cell connectors (3a, 3b) are applied, which connect the plates (1a, 1b) of each plate group (14a, 14b) together electrically, a sealant guide bridge (7) is laid on the top of the plate block (15) and a hardenable sealing compound (8) is introduced in such a way that it is arranged above the plates (1a, 1b) of the plate block (15), at least partially fills the space between the top of the plate block (15) and the cell connectors (3a, 3b), and the sealant guide bridge (7) delimits a region that is free from sealing compound (8) on the top of the plate block (15).

9. A vibration-resistant accumulator according to claim 1, characterized in that the sealant guide bridge (7) is made of polyvinyl chloride (PVC), polypropylene (PP), polyethylene (PE), polystyrene (PS), acrylonitrile butadiene styrene (ABS), styrene acrylonitrile (SAN) or polycarbonate.

10. A vibration-resistant accumulator according to claim 4, characterized in that the sealing compound (8) in addition at least partially fills the upper space between the outer plates (1a, 1b) of the plate block (15) and the side walls of the cell box (16).

11. A vibration-resistant accumulator according to claim 4, characterized in that on the side of the profile turned away form the region free from the sealing compound (8), the sealant guide bridge (7) has run-off surfaces (10) for draining of the sealing compound (8) when it is introduced into the accumulator.

12. A vibration-resistant accumulator according to claim 5, characterized in that on the side of the profile turned away form the region free from the sealing compound (8), the sealant guide bridge (7) has run-off surfaces (10) for draining of the sealing compound (8) when it is introduced into the accumulator.

13. A vibration-resistant accumulator according to claim 6, characterized in that on the side of the profile turned away form the region free from the sealing compound (8), the sealant guide bridge (7) has run-off surfaces (10) for draining of the sealing compound (8) when it is introduced into the accumulator.

* * * * *

UNITED STATES PATENT AND TRADEMARK OFFICE
CERTIFICATE OF CORRECTION

PATENT NO. : 6,962,761 B2
DATED : November 8, 2005
INVENTOR(S) : Friedrich Kramm et al.

It is certified that error appears in the above-identified patent and that said Letters Patent is hereby corrected as shown below:

Column 8,
Lines 16, 22 and 28, delete "form" insert -- from --.

Signed and Sealed this

Twenty-fourth Day of January, 2006

JON W. DUDAS
*Director of the United States Patent and Trademark Office*